(12) United States Patent
Morikawa (10) Patent No.: US 9,515,503 B2
(45) Date of Patent: Dec. 6, 2016

(54) BATTERY MONITORING DEVICE AND BATTERY MONITORING SYSTEM

(71) Applicant: KABUSHIKI KAISHA TOSHIBA, Tokyo (JP)

(72) Inventor: Masaaki Morikawa, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 339 days.

(21) Appl. No.: 14/194,770

(22) Filed: Mar. 2, 2014

(65) Prior Publication Data

US 2015/0077059 A1 Mar. 19, 2015

(30) Foreign Application Priority Data

Sep. 17, 2013 (JP) .................................. 2013-191779

(51) Int. Cl.
*H02J 7/00* (2006.01)
*B60L 11/18* (2006.01)

(52) U.S. Cl.
CPC .......... *H02J 7/0052* (2013.01); *B60L 11/1851* (2013.01); *B60L 2240/80* (2013.01); *B60L 2260/44* (2013.01); *Y02T 10/7005* (2013.01); *Y02T 10/705* (2013.01); *Y02T 10/92* (2013.01); *Y02T 90/16* (2013.01)

(58) Field of Classification Search
CPC .............................. H02J 7/0052; H02J 7/0021
USPC .................................................. 320/116, 134
See application file for complete search history.

(56) References Cited

U.S. PATENT DOCUMENTS

| 5,185,580 A * | 2/1993 | Nichols, III | H03H 7/38 324/538 |
| 7,304,517 B2 * | 12/2007 | Kim | H03K 5/1565 327/166 |
| 2003/0151967 A1 * | 8/2003 | Nagai | G11C 7/22 365/226 |

(Continued)

FOREIGN PATENT DOCUMENTS

| CN | 102239064 A | 11/2011 |
| JP | H08-137566 A | 5/1996 |

(Continued)

OTHER PUBLICATIONS

JP Office Action dated Dec. 15, 2015 for Application No. 2013-191779.

(Continued)

*Primary Examiner* — Edward Tso
*Assistant Examiner* — Jerry D Robbins
(74) *Attorney, Agent, or Firm* — Patterson & Sheridan, LLP.

(57) ABSTRACT

A battery monitoring system includes a clock input terminal, a data input terminal, a communication control circuit receiving the clock signal and the data signal from the clock input terminal and the data input terminal, respectively, a main power regulator controlled by the communication control circuit to supply and stop supplying main power, a charge circuit charged by the clock signal, and a sub power regulator started by a charge voltage of the charge circuit to supply a sub power to the communication control circuit. The communication control circuit controls the main power regulator with the data signal when the sub power is received from the sub power regulator.

20 Claims, 8 Drawing Sheets

(56) References Cited

U.S. PATENT DOCUMENTS

| | | | | |
|---|---|---|---|---|
| 2004/0136212 | A1* | 7/2004 | Abe | H02M 3/18 363/59 |
| 2010/0121511 | A1* | 5/2010 | Onnerud | B60L 11/1851 701/22 |
| 2011/0187436 | A1* | 8/2011 | Saito | G06G 7/18 327/345 |
| 2012/0163247 | A1* | 6/2012 | Shimamoto | H04B 1/525 370/278 |

FOREIGN PATENT DOCUMENTS

| | | |
|---|---|---|
| JP | H08-284730 A | 10/1996 |
| JP | H09-297625 A | 11/1997 |
| JP | H10-304654 A | 11/1998 |
| JP | 2002-354697 A | 12/2002 |
| JP | 2003242778 A | 8/2003 |
| JP | 2004222349 A | 8/2004 |
| JP | 2008-083436 A | 4/2008 |
| JP | 2010-081756 A | 4/2010 |
| JP | 2012505628 A | 3/2012 |

OTHER PUBLICATIONS

Chinese Office Action dated Apr. 25, 2016 for Patent Application No. 201410204239.0.

* cited by examiner

BATTERY MONITORING DEVICE AND BATTERY MONITORING SYSTEM

CROSS-REFERENCE TO RELATED APPLICATION

This application is based upon and claims the benefit of priority from Japanese Patent Application No. 2013-191779, filed Sep. 17, 2013, the entire contents of which are incorporated herein by reference.

FIELD

Embodiments described herein relate to a battery monitoring device and a battery monitoring system, and more particularly to a battery monitoring device and a battery monitoring system for a semiconductor integrated circuit with a standby mode.

BACKGROUND

Various types of semiconductor integrated circuits (hereinafter abbreviated as "IC"), such as a battery monitoring IC for monitoring a battery, are mounted on a vehicle. The battery monitoring IC monitors each voltage of a plurality of battery cells connected in series. The battery monitoring IC prevents overcharge and/or over-discharge, and estimates quantity of a remaining battery. The battery monitoring IC includes a main power regulator and a sub power regulator. In a standby mode, the main power regulator is turned off, while the sub power regulator is kept operating to maintain such a condition that commands from an MCU are receivable by a communication control circuit.

An IC system having a standby mode reduces current consumption by the IC, thereby decreasing the overall power consumption. Examples of this type of IC system known in the art include a bias circuit directed at reducing power consumption, and a charge pump circuit achieving both reduction of charge-up time and reduction of power consumption. A further example known in the art is a battery save circuit capable of applying a battery power voltage Vcc to a band gap reference type voltage generating circuit in response to external signals without producing any voltage loss.

However, to allow cancellation of the standby mode, the power needs to be constantly supplied to a receiving circuit of the communication control circuit even in the standby mode. Therefore, current consumption in the standby mode is difficult to be reduced to 0 µA.

DETAILED DESCRIPTION

In general, according to one embodiment, a battery monitoring device includes a clock input terminal configured to receive a clock signal, a data input terminal configured to receive a data signal, a communication control circuit configured to receive the clock signal from the clock input terminal and the data signal from the data input terminal, a main power regulator controlled by the communication control circuit to supply and stop supplying main power, a charge circuit configured to be charged by the clock signal, and a sub power regulator configured to be started by a charge voltage of the charge circuit to supply a sub power to the communication control circuit, wherein the communication control circuit controls the main power regulator with the data signal when the sub power is received from the sub power regulator.

According to another embodiment, a battery monitoring system includes a processor, a plurality of battery monitoring devices connected in series, one of the battery monitoring devices being connected with the processor, and a plurality of batteries disposed in parallel in correspondence with the plural battery monitoring devices, wherein each of the batteries includes a plurality of cells connected in series and is to be monitored by a respective one of the battery monitoring devices.

A battery monitoring device and a battery monitoring system according to several exemplary embodiments are hereinafter described with reference to the drawings.

First Embodiment

Figure 1:
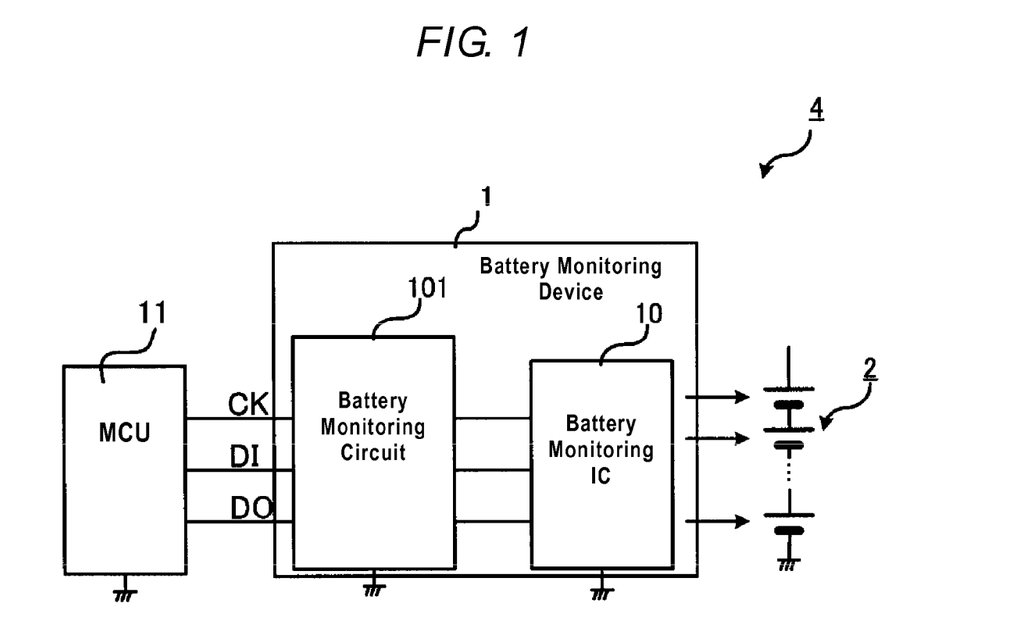
FIG. 1 is a block diagram showing an application example of a battery monitoring system according to a first embodiment.

FIG. 1 is a block diagram showing an application example of a battery monitoring system according to a first embodiment. A battery monitoring system 4 includes a micro control unit (MCU) 11, a battery 2, and a battery monitoring device 1 monitoring the battery 2. The battery monitoring system 4 monitors the voltage or current of the battery 2 corresponding to a monitoring target. The battery 2 is a lithium ion battery constituted by a plurality of battery cells connected in series, for example. The battery monitoring device 1 includes a battery monitoring circuit 101 and a battery monitoring IC 10.

The battery monitoring IC 10 measures each voltage of the cells of the battery 2 and collects measurements of the voltages. The battery monitoring IC 10 receives a clock signal CK and a command or data DI from the MCU 11 via the battery monitoring circuit 101, and transmits a data output DO corresponding to the respective measured cell voltages to the MCU 11. The battery monitoring circuit 101 has a standby control function which switches the operation state (standby mode and normal mode) of the battery monitoring IC 10 in response to commands issued from the MCU 11.

Figure 2:
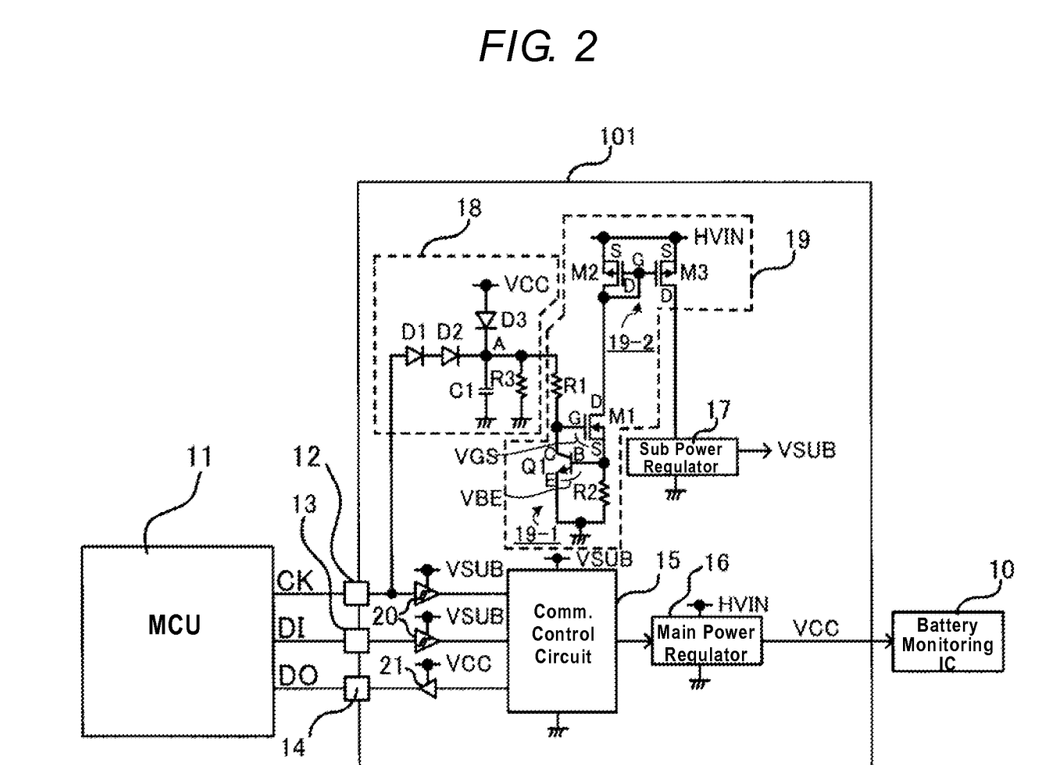
FIG. 2 is a circuit structure diagram showing the structure of a battery monitoring circuit included in the battery monitoring system according to the first embodiment.

FIG. 2 is a circuit structure diagram showing the battery monitoring circuit 101. The battery monitoring circuit 101 is a standby control circuit which controls the operation state of the battery monitoring IC 10 such that the operation state thereof switches between the normal mode and the standby mode in accordance with commands received from the MCU 11.

The battery monitoring circuit 101 includes a communication control circuit 15, a main power regulator 16, a sub power regulator 17, a charge circuit 18, and a constant-current circuit 19.

The communication control circuit 15 connects with the MCU 11 via a clock input terminal 12 through which the clock signal CK is inputted to the communication control circuit 15, a data input terminal 13 through which command information is inputted to the communication control circuit 15, and a data output terminal 14 through which voltage information is outputted from the communication control circuit 15. Each of the clock signal CK and the command information is inputted to the communication control circuit 15 via a buffer amplifier 20 to which a sub power voltage VSUB is supplied. The voltage information is outputted to the MCU 11 through a buffer amplifier 21 to which a main power voltage VCC is supplied. The communication control circuit 15 receives supply of the voltage VSUB as operation power.

The communication control circuit 15 operates in accordance with the clock signal CK, and functions as an interface between the MCU 11 and the battery monitoring IC 10 for mutual communication therebetween using various types of commands. The communication control circuit 15 controls the main power regulator 16 based on a wake up command or a standby command. More specifically, the communication control circuit 15 supplies the main power VCC to the battery monitoring IC 10 and other ICs when receiving the wake up command, and stops supply of the main power VCC when receiving the standby command. The communication control circuit 15 further outputs a cell voltage of the battery 2 measured by the battery monitoring IC 10 to the MCU 11 when receiving a monitoring command.

The main power regulator 16 supplies the VCC to the battery monitoring IC 10 and other ICs. The main power regulator 16 switches the operation state of the battery monitoring circuit 101 by controlling the supply and stop of the main power. The main power regulator 16 receives supply of an HVIN as operation power.

The charge circuit 18 charges power in response to the clock signal CK while the main power regulator 16 is stopping supply of power. The charge circuit 18 is constituted by diodes D1 and D2 connected in series, a capacitor C1 one end of which is connected with the diodes D1 and D2 and the other end of which is grounded, a discharge resistor R3 connected in parallel with the capacitor C1 with one end of the resistor R3 grounded, and a diode D3 the anode of which is connected with the main power VCC.

The diodes D1 and D2 constitute a first voltage drop element using a forward direction drop voltage Vf. The anode of the diode D1 is connected with the clock input terminal 12, while the cathode of the diode D2 is connected with the one end of the capacitor C1. The clock signal CK having a rectangular pulse waveform is supplied to the capacitor C1 via the first voltage drop element to charge the capacitor C1. By charging the capacitor C1, the potential at a connection point A (hereinafter referred to as "point A") between the cathode electrode of the diode D2 and the capacitor C1 rises.

The main power VCC is connected via the diode D3 to the connection point A between the cathode of the diode D2 and the capacitor C1. The third diode D3 functions as a second voltage drop element using the forward direction drop voltage Vf. The second clock signal CK and the main power voltage VCC have the same voltage such as 5V. The voltage at the point A, that is, the voltage of the discharge resistor R3 is supplied to the constant-current circuit 19 as the output voltage from the charge circuit 18.

The constant-current circuit 19 includes a constant-current source circuit 19-1 and a current mirror circuit 19-2. The constant-current source circuit 19-1 includes a resistor R1 one end of which is connected with the point A of the discharge circuit 18, a transistor Q1 the collector of which is connected with the other end of the resistor R1 and the emitter of which is grounded, a resistor R2 one end of which is connected with the base of the transistor Q1 and the other end of which is grounded, and an N-type MOS transistor M1, the source of which is connected with the base of the transistor Q1 and the gate of which is connected with the collector of the transistor Q1. The current mirror circuit 19-2 includes a P-type MOS transistor M2, and a P-type MOS transistor M3 connected in parallel with the MOS transistor M2. The drain of the MOS transistor M2 is connected with the drain of the MOS transistor M1. The sources of the MOS transistor M2 and the MOS transistor M3 receive supply of the power voltage HVIN. The power voltage HVIN is constantly supplied both in the standby mode and the normal mode. However, no current flows in the standby mode, wherefore no power is consumed. The respective MOS transistors M2 and M3 connect to a common gate G. The gate and the drain of the MOS transistor M2 are diode-connected.

The drain of the MOS transistor M3 is connected with the sub power regulator 17. Accordingly, constant current generated by the constant-current circuit 19 is supplied to the sub power regulator 17.

Figure 3:
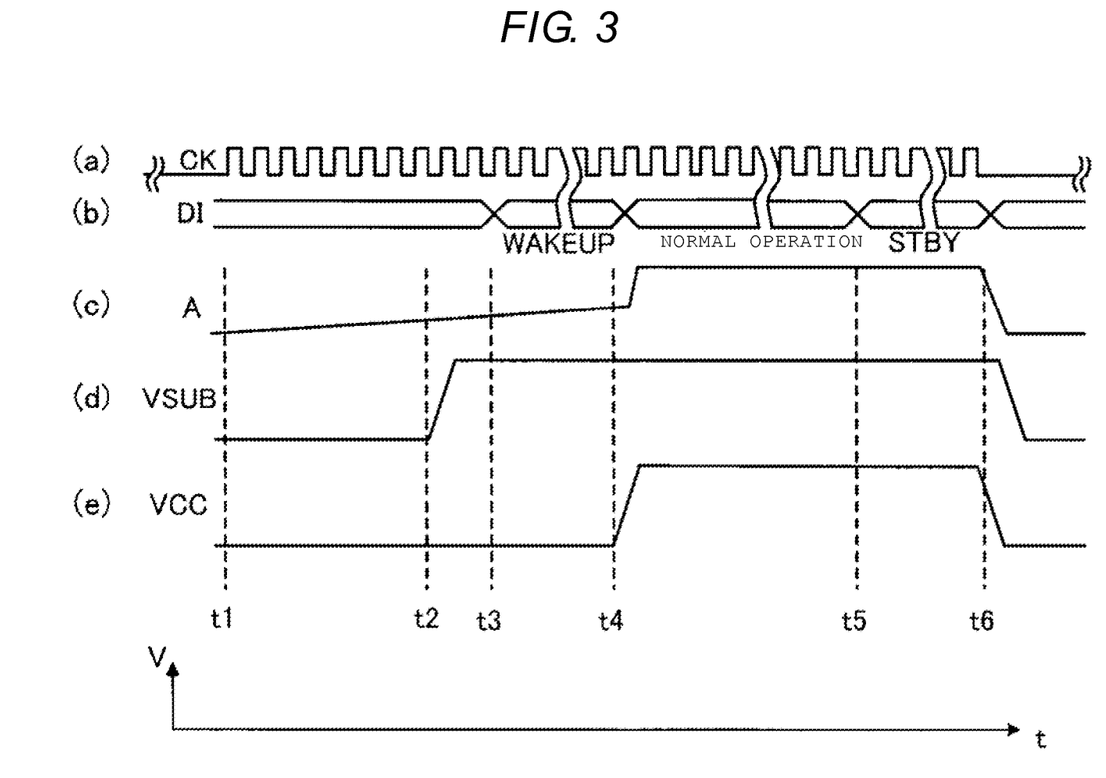
FIG. 3 is a voltage waveform chart of respective parts of the battery monitoring circuit shown in FIG. 2, for illustrating the operation of the battery monitoring circuit.

Described herein is the operation of the battery monitoring circuit 101 of the battery monitoring system 4 according to this embodiment. FIG. 3 is a voltage waveform chart of the respective parts of the battery monitoring circuit shown in FIG. 2 for illustrating the operation of the battery monitoring circuit. In FIG. 3, the horizontal axis represents time t, while the vertical axis represents voltage V. A graph (a) indicates a waveform of the clock signal CK inputted to the battery monitoring IC 101, a graph (b) indicates commands, a graph (c) indicates the potential at the point A, a graph (d) indicates the potential of the power VSUB for the sub power regulator 17, and a graph (e) indicates the potential of the power VCC for the main power regulator 16.

At a time t1, the clock signal CK is supplied to the clock input terminal 12. Before the time t1, the clock signal CK is not supplied to the clock input terminal 12. With supply of the clock signal CK at the time t1, charging of the capacitor C1 takes place, whereby the potential at the point A gradually increases as in the graph (c) in FIG. 3.

In this case, the collector potential of the transistor Q1 and the gate voltage of the MOS transistor M1 connected to the point A via the resistor R1 similarly increase. A voltage VBE between the base and emitter of the transistor Q1 is kept constant at 0.6V, for example, while a voltage VCE between the collector and emitter does not greatly vary for a collector current Ic of the transistor Q1. When the VCE becomes higher than the VBE, a voltage VGS between the gate and source of the MOS transistor M1 increases. When the VGS exceeds a gate threshold voltage Vth of the MOS transistor M1 and produces a condition of VCE (Q1)=VBE (Q1)+Vth (M1) at a time t2, the MOS transistor M1 is turned on. As a result, a drain current flows in the resistor R2, whereby the voltage of the resistor R2 increases. In accordance with the voltage increase in the resistor R2, the gate voltage of the MOS transistor M2 increases, allowing the MOS transistors M2 and M3 to be turned on. Consequently, a mirror current equivalent to the drain current of the MOS transistor M2 is outputted from the MOS transistor M3 to the sub power regulator 17.

When current is supplied to the sub power regulator 17, the sub power VSUB becomes high level at the time t2. As a result, the sub power VSB is supplied to the buffer amplifier 20 and the communication control circuit 15, in which condition commands are receivable by the communication control circuit 15.

When a WAKEUP command is inputted to the communication control circuit 15 at a time t3 subsequently to the time t2, the communication control circuit 15 starts the main power regulator 16 and supplies the main power voltage VCC to the battery monitoring IC 10 (time t4). Then, the battery monitoring circuit 101 switches the battery monitoring IC 10 from the standby mode to the normal mode.

The main power voltage VCC is supplied to the point A of the charge circuit 18 via the diode D3. It is assumed herein that the diodes D1, D2, and D3 have the same forward direction voltage Vf of 0.7V, for example. After charging by the clock pulse signal CK of 5V, the potential at the point A in the standby mode drops to 3.6V in correspondence with the voltage drop of the forward direction voltage Vf of the diodes D1 and D2. On the other hand, after supply of a voltage of 5V from the main power voltage VCC, the potential at the point A in the normal mode drops to 4.3V in correspondence with the voltage drop of the forward direction voltage Vf of the diode D3. As a result, the potential at the point A in the normal mode becomes 4.3V which is higher than 3.6V in the standby mode. In this manner, the clock signal CK is not supplied to the charge circuit 18 but to the communication control circuit 15. The main power voltage VCC is further supplied to the buffer amplifier 21, allowing supply of the data output from the communication control circuit 15 to the MCU 11 via the buffer amplifier 21. Accordingly, in the state of the normal mode, communication control between the MCU 11 and the communication control circuit 15 for the monitoring of the battery monitoring IC 10 is achieved through data communication.

When receiving the standby command at a time t5, the communication control circuit 15 controls the main power regulator 16 such that supply of the main power VCC stops (time t6). When the potential at the point A of the charge circuit 18 becomes lower than VBE (Q1)+Vth (M1) by this step, the operation of the constant-current circuit 18 is turned off. In this condition, no current is supplied to the sub power regulator 17, wherefore supply of the sub power VSUB stops. As a result, the battery monitoring circuit 101 switches the normal mode of the battery monitoring IC 10 to the standby mode. On and after the time t6, supply of the clock signal CK from the MCU 11 stops.

According to the battery monitoring circuit 101 in the first embodiment discussed above, the standby mode and the normal mode of the battery monitoring IC 10 as the control target are switched based on the power supplied by the clock signal. In the standby mode, no clock signal is supplied to the battery monitoring circuit 101. Accordingly, standby current for the battery monitoring circuit 101 is reduced to zero, in which condition no power is consumed.

Second Embodiment

Figure 4:
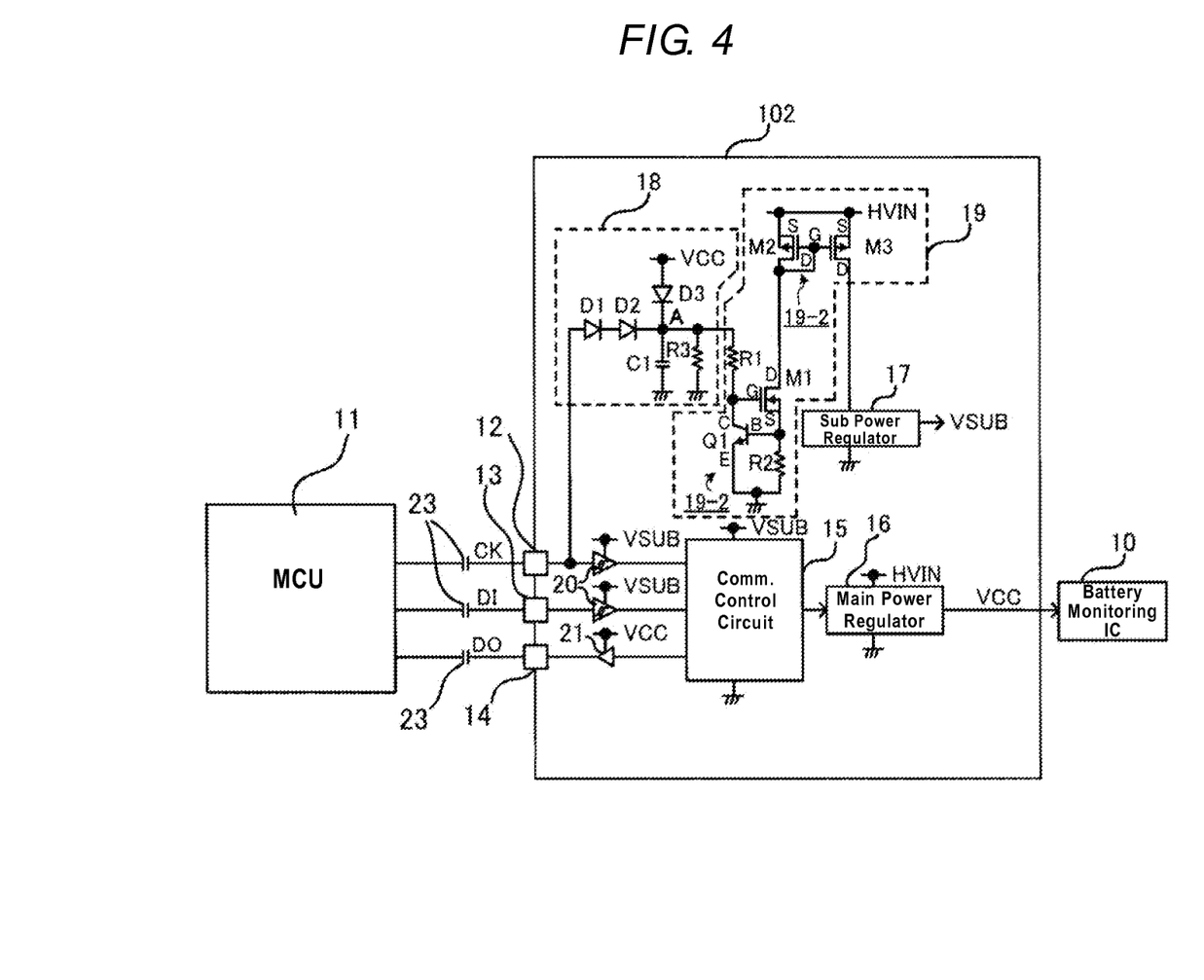
FIG. 4 is a circuit structure diagram showing the structure of a battery monitoring circuit included in a battery monitoring system according to a second embodiment.

FIG. 4 illustrates the structure of a battery monitoring circuit 102 included in a battery monitoring system according to a second embodiment.

The battery monitoring circuit 102 has a structure similar to the corresponding structure in the first embodiment except in that the connections between the MCU 11 and the respective components of the clock input terminal 12, the data input terminal 13, and the data output terminal 14 are changed to connections by capacitive coupling using capacitors 23. The constituent elements shown in FIG. 4 similar to the corresponding constituent elements shown in FIG. 1 are given similar reference numbers and signs, and the same explanation is not repeated.

According to the battery monitoring circuit 102 including connections by capacitive coupling as illustrated, monitoring of multiple batteries connected in series is allowed by using a plurality of the battery monitoring ICs 10 of the first embodiment connected in series.

Figure 5:
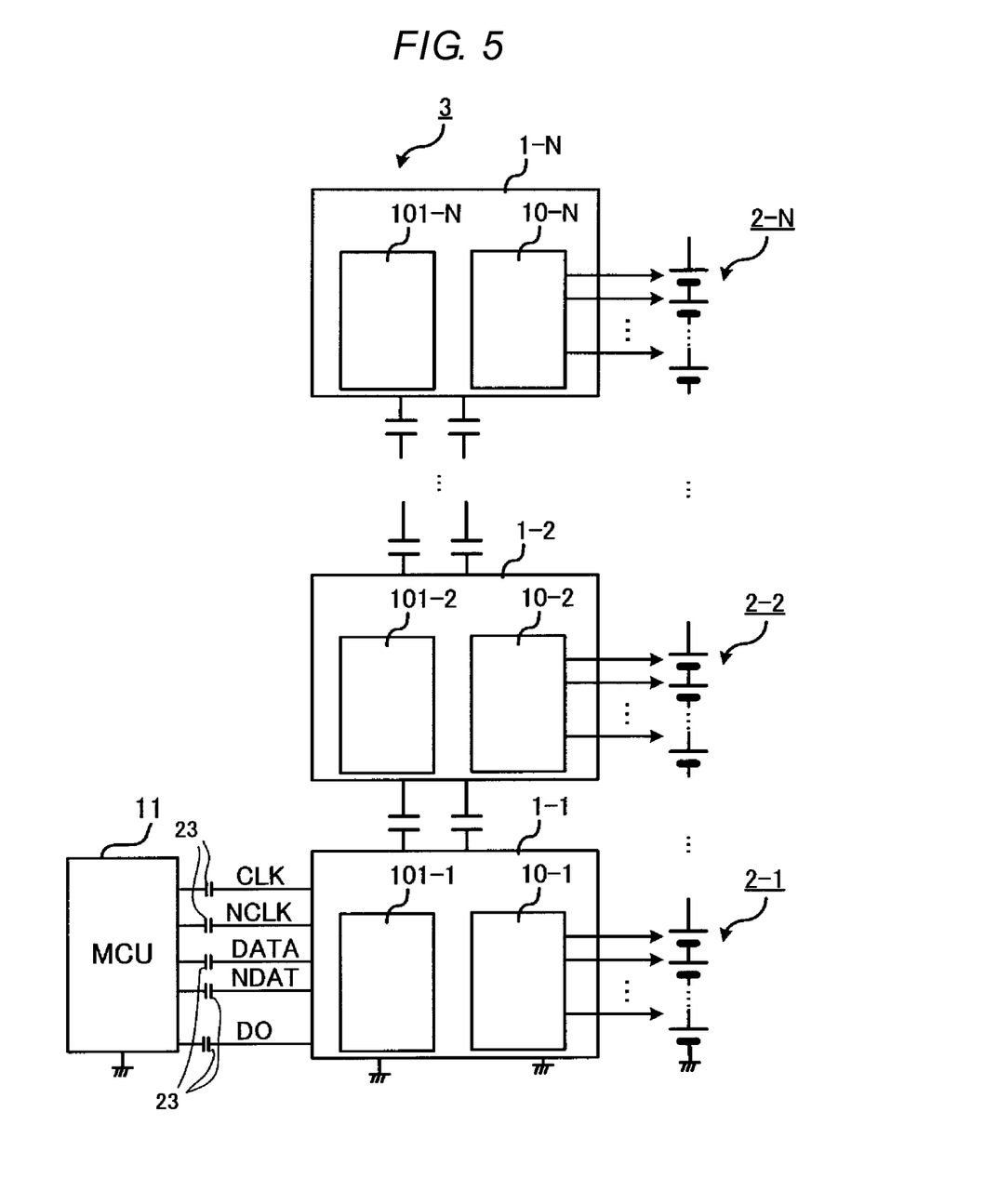
FIG. 5 is a block diagram showing an application example of the battery monitoring system according to the second embodiment.

FIG. 5 is a block diagram showing an example of a battery monitoring system 3 which monitors multiple batteries. The battery monitoring system 3 connects a plurality of the battery monitoring devices 1 of the first embodiment in series. Battery monitoring devices 1-1 through 1-N are connected with each other for mutual connection via capacitive elements ("mutual connection" in this context refers to connection between each of the adjoining pairs of the battery monitoring devices 1).

In the battery monitoring system 3, a plurality of battery monitoring ICs 10-1, 10-2, through 10-N monitor battery cell groups 2-1, 2-2, through 2-N, respectively, with one-to-one correspondence. The battery cell groups 2-1 through 2-N form 6 through 14 cell groups dividing several tens through approximately one hundred battery cells connected in series, for example.

In the battery monitoring device 1-1 disposed in the first stage, supply lines CLK and NCLK are provided between the battery monitoring IC 10-1 and the MCU 11. The phase of the NCLK is opposite to the phase of the CLK. Supply lines DATA and NDAT are further provided to connect between the battery monitoring IC 10-1 and the MCU 11 in the first stage. The phase of the NDAT is opposite to the phase of the DAT.

In the battery monitoring system 3 thus structured, one end of the battery monitoring device 1-1 in the first stage is grounded similarly to the MCU 11. However, the battery monitoring devices 1-2 through 1-N in the two or higher stages are not allowed to connect with the ground potential, wherefore the battery monitoring devices 1-2 through 1-N connect with each other by capacitive coupling so as to connect with the MCU 11 with alternating current connection.

According to the second embodiment, therefore, the battery monitoring circuit 102 is allowed to provide both the functions as the battery monitoring device 1-1 in the first stage, and as the battery monitoring devices 1-2 through 1-N in the second and higher stages. Accordingly, this structure allows common use of the parts in the semiconductor integrated circuits, or improves yields.

Third Embodiment

Figure 6:
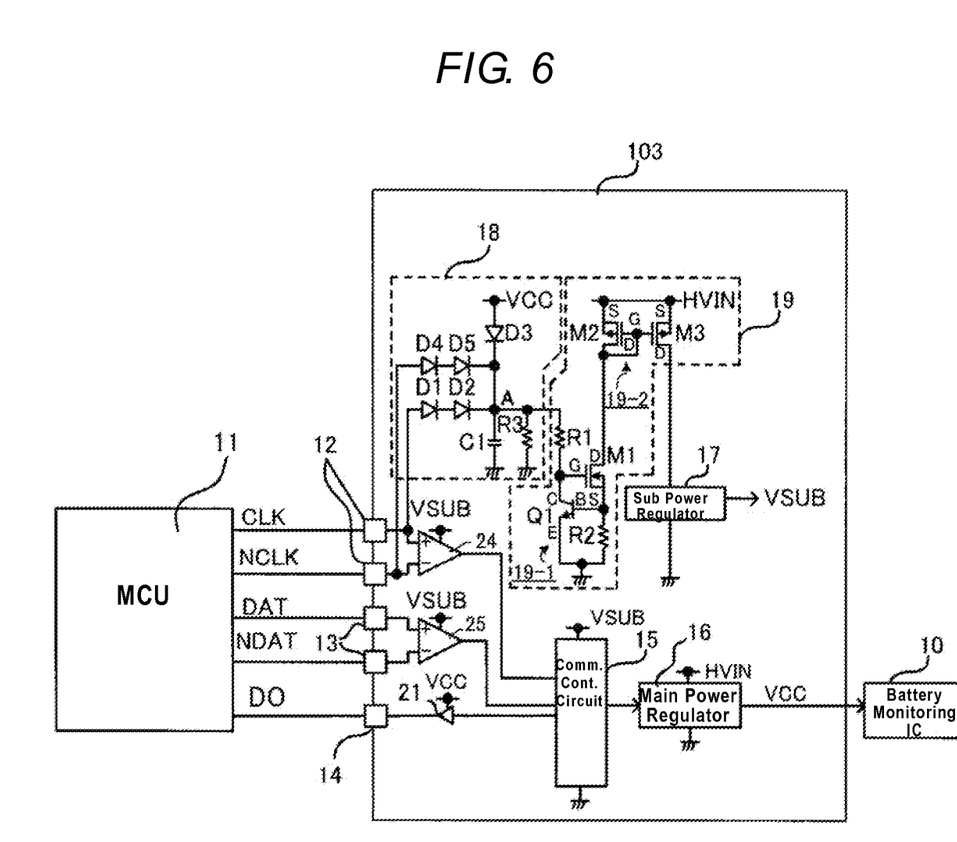
FIG. 6 is a circuit structure diagram showing the general structure of a battery monitoring circuit included in a battery monitoring system according to a third embodiment.

FIG. 6 illustrates the general structure of a battery monitoring circuit 103 included in a battery monitoring system according to a third embodiment. The constituent elements shown in FIG. 6 similar to the corresponding constituent elements shown in FIG. 1 or 4 are given similar reference numbers and signs, and the same explanation is not repeated.

The structure according to the third embodiment uses a differential communication system, where a normal phase clock signal CLK, a reverse phase NCLK as a reversed signal of the normal clock signal CLK, a normal phase data signal DAT, and a reverse phase data signal NDAT as a reversed signal of the normal phase data signal DAT are inputted to the battery monitoring circuit 103. The normal phase clock signal CLK and the normal phase data signal DAT are substantially identical to the clock signal CK and the data signal DI in the first and the second embodiments, respectively. However, these signals are given different reference signs for convenience of explanation.

A pair of the clock signals CLK and NCLK are inputted to positive and negative input terminals of a first differential amplifier 24, respectively. The clock signal CLK is inputted to the two diodes D1 and D2 connected in series. The clock signal NCLK is inputted to diodes D4 and D5. The respective voltages of the clock signals CLK and NCLK drop while passing through the diodes D1 and D2 and the diodes D4 and D5, respectively. The corresponding clock signals are supplied to the point A of the charge circuit 18.

A pair of the data signals DAT and NDAT are inputted to positive and negative input terminals of a second differential amplifier 25, respectively. Differential output signals of the first and second differential amplifiers 24 and 25 are supplied to the communication control circuit 15.

Figure 7:
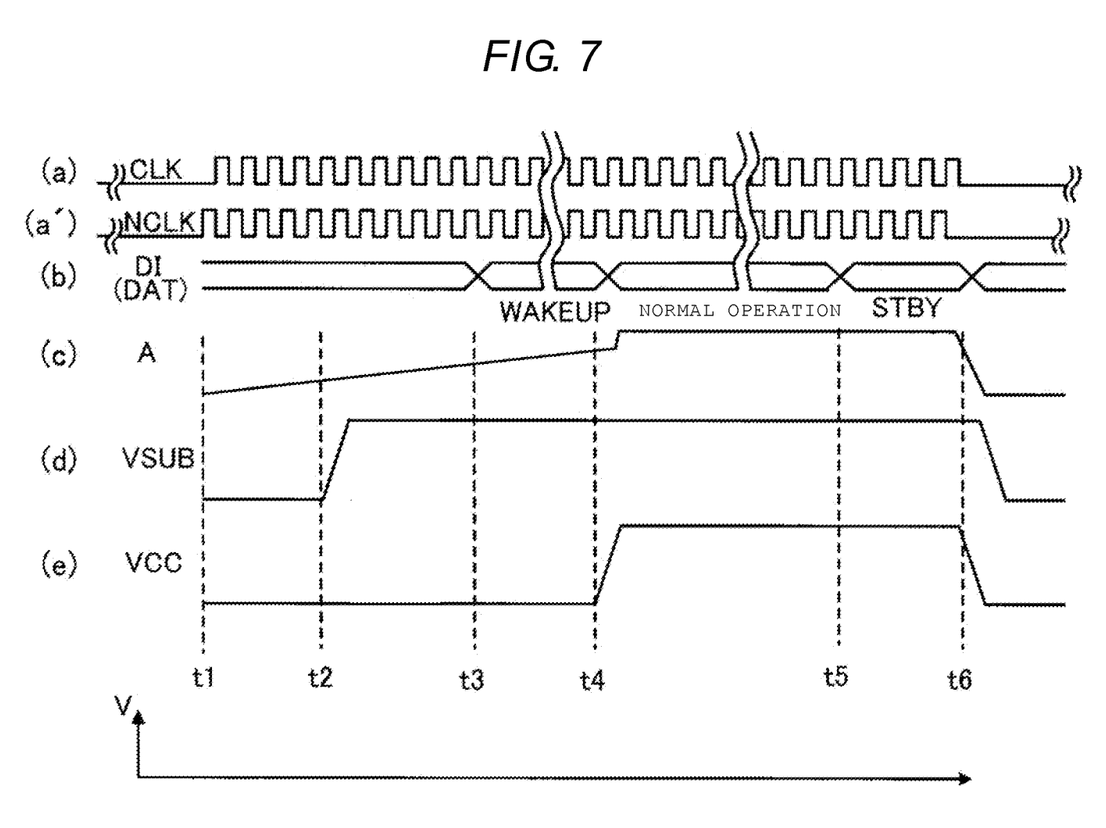
FIG. 7 is a voltage waveform chart of respective parts of the battery monitoring circuit shown in FIG. 6, for illustrating the operation of the battery monitoring circuit.

FIG. 7 is a waveform chart showing the respective parts of the battery monitoring circuit 103 for explaining the operation of the battery monitoring circuit 103 having this structure. The parts in this figure similar to the corresponding parts in FIG. 3 are given similar reference numbers and signs, and the same detailed explanation is not repeated.

In this figure, a graph (a) indicates the normal phase clock signal CLK, while a graph (a') indicates the reverse phase clock signal NCLK. These clock signals are supplied to the point A of the charge circuit 18 via the diodes D1 and D2 and the diodes D4 and D5. By charging of the capacitor C1, the potential at the point A becomes approximately twice the corresponding potential shown in FIG. 3. The normal phase clock signal CLK and the reverse phase clock signal NCLK are amplified by the first differential amplifier 24. The amplified voltage is approximately twice the output of the buffer amplifier 20 shown in FIG. 2. The amplified signal is supplied to the communication control circuit 15.

Because of this, the capacitor C1 is charged at a speed higher than the charging speed of the charge circuit 18 charged by the clock signal. Thus, the switching speed from the standby mode to the normal mode improves.

Similarly, a pair of the normal phase data signal DAT and the reverse phase data signal NDAT are amplified by the second differential amplifier 25. The amplified voltage is approximately twice the output of the buffer amplifier 20. The amplified signal is supplied to the communication control circuit 15.

Accordingly, the battery monitoring circuit 103 in the third embodiment supplies the clock signal and the data signal, each of which is constituted by a pair of normal phase and reverse phase signals, to the communication control circuit 15. The differential communication allows the communication control to be resistive to in-phase noise. Moreover, the switching speed from the standby mode to the normal mode improves.

In addition, similarly to the second embodiment, monitoring of multiple batteries is allowed when the battery monitoring devices (battery monitoring circuits 103 and battery monitoring ICs 10) are connected in series with capacitive coupling.

Fourth Embodiment

Figure 8:
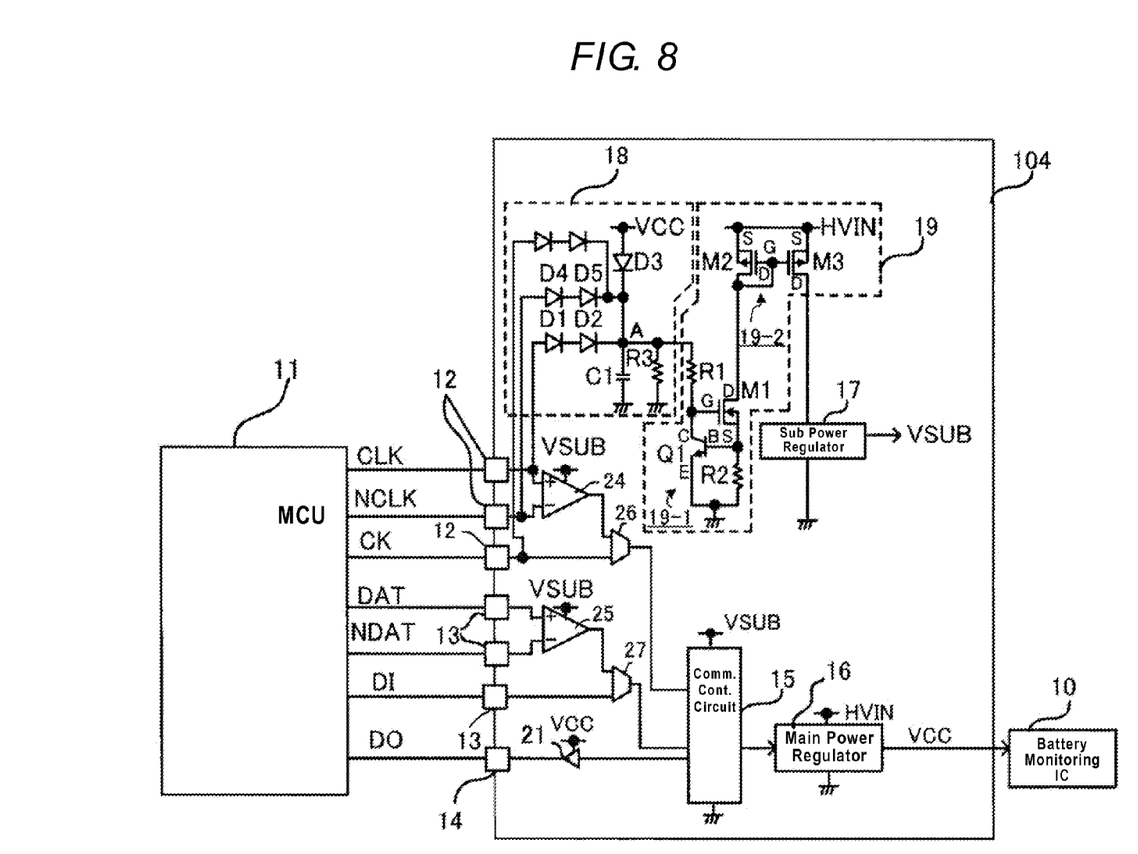
FIG. 8 is a circuit structure diagram showing the general structure of a battery monitoring circuit included in a battery monitoring system according to a fourth embodiment.

FIG. 8 illustrates the general structure of a battery monitoring circuit 104 included in a battery monitoring system according to a fourth embodiment. The constituent elements shown in this figure similar to the corresponding constituent elements shown in FIG. 2, 4 or 6 are given similar reference numbers and signs, and the same explanation is not repeated.

The battery monitoring circuit 104 according to the fourth embodiment has both the single end communication function provided by the battery monitoring circuit 102 of the second embodiment, and the differential communication function provided by the battery monitoring circuit 103 of the third embodiment. The battery monitoring circuit 104 selects either the single end communication function or the differential communication function, and performs the selected function.

More specifically, according to the battery monitoring circuit 104, the normal and reverse phase clock signals CLK and NCLK are supplied to the input terminals 12 of the communication control circuit 15 in a manner similar to the corresponding operation in the third embodiment shown in FIG. 6. The positive clock signal CK is supplied to the battery monitoring circuit 104 in a manner similar to the corresponding operation in the second embodiment shown in FIG. 4. The normal phase and reverse phase clock signals CLK and NCLK are inputted to the positive and negative input terminals of the first differential amplifier 24 similarly to the structure shown in FIG. 6. The clock signals CLK and NCLK are supplied to the point A of the charge circuit 18 via the diodes D1 and D2 and the diodes D4 and D5. The two diodes D1 and D2 connected in series are first voltage drop elements. The diodes D4 and D5 are elements similar to the diodes D1 and D2.

The output signal of the first differential amplifier 24 and the normal phase clock signal CK are inputted to a first selector circuit 26. The first selector circuit 26 supplies either the output signal or the clock signal CK to the communication control circuit 15.

Moreover, according to the battery monitoring circuit 104, the positive and negative data signals DAT and NDAT are supplied to the input terminals 13 of the communication control circuit 15 via the capacitors 23 in a manner similar to the corresponding operation of the third embodiment shown in FIG. 6. The normal phase data signal DI is supplied to the input terminal 13 of the battery monitoring circuit 104 different from the input terminals 13 for the data signals DAT and NDAT in a manner similar to the corresponding operation of the second embodiment shown in FIG. 4. The normal phase and reverse phase data signals DAT and NDAT are inputted to the positive and negative input terminals of the second differential amplifier 25 similarly to the structure shown in FIG. 6.

The output signal of the second differential amplifier 25 and the normal phase data signal DI are supplied to a second selector circuit 27. The second selector circuit 27 supplies either the output signal or the data signal DI to the communication control circuit 15. Other structures of the battery monitoring circuit 104 are substantially similar to the corresponding structures of the battery monitoring circuit 102 according to the second embodiment shown in FIG. 8, and the same detailed explanation is not repeated herein.

According to the fourth embodiment, therefore, the battery monitoring circuit 104 selects either the single end communication function or the differential communication function, and provides the selected function. Accordingly, the battery monitoring circuit 104 is allowed to use a communication function not affected by noise regardless of the presence or absence of in-phase noise. In addition, the switching speed from the standby mode to the normal mode improves.

Moreover, similarly to the second embodiment, monitoring of multiple batteries is allowed when the battery monitoring devices (battery monitoring circuits 104 and battery monitoring ICs 10) are connected in series with capacitive coupling.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, while the charge circuit in the respective embodiments includes the diodes D1 and D2 in two stages connected in series as the first voltage drop elements, diodes in a larger number of stages than two stages may be provided and connected in series. Moreover, the second voltage drop element constituted by the diode D3 in the embodiments is not limited to one diode but may be constituted by a plurality of diodes connected in series. In this case, however, it is required that the first potential produced after voltage drop from the clock signal voltage is lower than the second potential produced after voltage drop from the main power voltage.

According to the respective embodiments, the output of the charge circuit 18 is supplied to the sub power regulator 17 via the constant-current circuit 19. However, this output may be supplied via other driving circuits in lieu of the constant-current circuit 19. In addition, when the sub power regulator 17 starts at a low voltage such as 3.3V, this output may be directly supplied without passing through these circuits.

According to the respective embodiments, the circuit or device to which the use of the battery monitoring circuit is targeted is the battery monitoring IC. However, the target circuit or device is not limited to this example but may be any types of circuits or devices as long as these circuits or devices operate in the standby mode and the normal mode.

What is claimed is:

1. A battery monitoring device, comprising:
   a clock input terminal configured to receive a clock signal;
   a data input terminal configured to receive a data signal;
   a communication control circuit configured to receive the clock signal from the clock input terminal and the data signal from the data input terminal;
   a main power regulator controlled by the communication control circuit to supply or stop supplying main power;
   a charge circuit connected to the clock input terminal and configured to be charged by the clock signal; and
   a sub power regulator configured to be activated by a charge voltage from the charge circuit and, when activated, to supply a sub power to the communication control circuit,
   wherein the communication control circuit controls the main power regulator in accordance with the data signal when the sub power is being received from the sub power regulator.

2. The device according to claim 1, wherein the charge circuit comprises:
   a capacitor having a first end connected with the clock input terminal via a first voltage drop element and with the main power via a second voltage drop element, and a second end that is grounded, and
   a circuit supplying a current to the sub power regulator when the capacitor charges to a predetermined voltage level.

3. The device according to claim 2, wherein the first voltage drop element includes first and second diodes connected in series between the clock input terminal and the capacitor.

4. The device according to claim 3, wherein the second voltage drop element includes a third diode connected between the main power and the capacitor.

5. The device according to claim 2, wherein
   the charge circuit is configured to stop charging by the clock signal when a second voltage produced by a voltage drop through the second voltage drop element is higher than a first voltage produced by a voltage drop through the first voltage drop element.

6. The device according to claim 2, wherein
   the clock input terminal comprises a normal phase clock input terminal configured to receive a normal phase clock signal, and a reverse phase clock input terminal configured to receive a reverse phase clock signal,
   the normal phase clock input terminal and the reverse phase clock input terminal are connected with the capacitor via the first voltage drop element and a third voltage drop element, respectively, and with the communication control circuit via a first differential amplifier,
   the data input terminal comprises a normal phase data input terminal configured to receive a normal phase data signal, and a reverse phase data input terminal configured to receive a reverse phase data signal, and
   the normal phase data input terminal and the reverse phase data input terminal are connected with the communication control circuit via a second differential amplifier.

7. The device according to claim 6, wherein the third voltage drop element is connected to the capacitor in parallel with the first voltage drop element.

8. The device according to claim 7, wherein each of the first and third voltage drop elements includes at least two diodes connected in series between the respective clock input terminal and the capacitor.

9. A battery monitoring system, comprising:
   a processor;
   a plurality of battery monitoring devices connected in series, one of the battery monitoring devices being connected with the processor; and
   a plurality of batteries disposed in parallel in correspondence with the plural battery monitoring devices, wherein each of the batteries comprises a plurality of cells connected in series and is to be monitored by a respective one of the battery monitoring devices,
   wherein each of the battery monitoring devices comprises:
   a clock input terminal configured to receive a clock signal from the processor,
   a data input terminal configured to receive a data signal from the processor,
   a communication control circuit configured to receive the clock signal from the clock input terminal and the data signal from the data input terminal,
   a main power regulator controlled by the communication control circuit to supply or stop supplying main power, a charge circuit connected to the clock input terminal and configured to be charged by the clock signal, and a sub power regulator configured to be activated by a charge voltage from the charge circuit and, when activated, to supply a sub power to the communication control circuit, and wherein the communication control circuit controls the main power regulator in accordance with the data signal when the sub power is being received from the sub power regulator.

10. The system according to claim 9, wherein each pair of the battery monitoring devices is connected by capacitors.

11. The system according to claim 10, wherein the charge circuit comprises:

a capacitor having a first end connected with the clock input terminal via a first voltage drop element and with the main power via a second voltage drop element, and a second end that is grounded, and a circuit supplying a current to the sub power regulator when the capacitor charges to a predetermined voltage level.

12. The system according to claim 11, wherein the first voltage drop element includes first and second diodes connected in series between the clock input terminal and the capacitor.

13. The system according to claim 12, wherein the second voltage drop element includes a third diode connected between the main power and the capacitor.

14. The system according to claim 11, wherein the charge circuit is configured to stop charging by the clock signal when a second voltage produced by a voltage drop through the second voltage drop element is higher than a first voltage produced by a voltage drop through the first voltage drop element.

15. The system according to claim 11, wherein the clock input terminal comprises a normal phase clock input terminal configured to receive a normal phase clock signal, and a reverse phase clock input terminal configured to receive a reverse phase clock signal, the normal phase clock input terminal and the reverse phase clock input terminal are connected with the capacitor via the first voltage drop element and a third voltage drop element, respectively, and with the communication control circuit via a first differential amplifier, the data input terminal comprises a normal phase data input terminal configured to receive a normal phase data signal, and a reverse phase data input terminal configured to receive a reverse phase data signal, and the normal phase data input terminal and the reverse phase data input terminal are connected with the communication control circuit via a second differential amplifier.

16. The system according to claim 15, wherein the third voltage drop element is connected to the capacitor in parallel with the first voltage drop element.

17. The system according to claim 16, wherein each of the first and third voltage drop elements includes at least two diodes connected in series between the respective clock input terminal and the capacitor.

18. A battery monitoring device, comprising:

a clock input terminal configured to receive a clock signal;

a data input terminal configured to receive a data signal;

a normal phase clock input terminal configured to receive a normal phase clock signal;

a reverse phase clock input terminal configured to receive a reverse phase clock signal;

a normal phase data input terminal configured to receive a normal phase data signal;

a reverse phase data input terminal configured to receive a reverse phase data signal;

a first differential amplifier configured to receive the normal phase clock signal from the normal phase clock input terminal and the reverse phase clock signal from the reverse phase clock input terminal and output a first differential amplified signal;

a second differential amplifier configured to receive the normal phase data signal from the normal phase data input terminal and the reverse phase data signal from the reverse phase data input terminal and output a second differential amplified signal;

a first selector that is controlled to select between the clock signal and the first differential amplified signal and output a selected clock signal;

a second selector that is controlled to select between the data input signal and the second differential amplified signal and output a selected data input signal;

a communication control circuit configured to receive the selected clock signal and the selected data input signal;

a main power regulator controlled by the communication control circuit to supply or stop supplying main power;

a charge circuit connected to the clock input terminal and the normal and reverse phase clock input terminals and configured to be charged by the clock signal or the normal phase and reverse phase clock signals; and a sub power regulator configured to be activated by a charge voltage from the charge circuit and, when activated, to supply a sub power to the communication control circuit, wherein the communication control circuit controls the main power regulator in accordance with the data signal when the sub power is being received from the sub power regulator.

19. The device according to claim 18, wherein the charge circuit comprises:

a capacitor having a first end connected with the clock input terminal or the normal phase clock input terminal via a first voltage drop element, with the reverse phase clock input terminal via a second voltage drop element, and with the main power via a third voltage drop element, and a second end that is grounded, and a circuit supplying a current to the sub power regulator when the capacitor charges to a predetermined voltage level.

20. The device according to claim 19, wherein the first voltage drop element includes first and second diodes connected in series between the clock input terminal and the capacitor and between the normal phase clock input terminal and the capacitor, the second voltage drop element includes third and fourth diodes connected in series between the reverse phase clock input terminal and the capacitor, and the third voltage drop element includes a fifth diode connected between the main power and the capacitor.

* * * * *